C. J. ROY.
TRAP.
APPLICATION FILED JUNE 21, 1920.
1,377,441. Patented May 10, 1921.
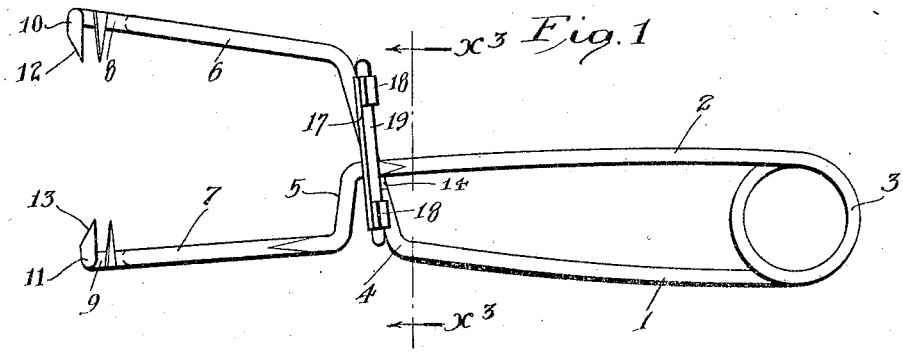
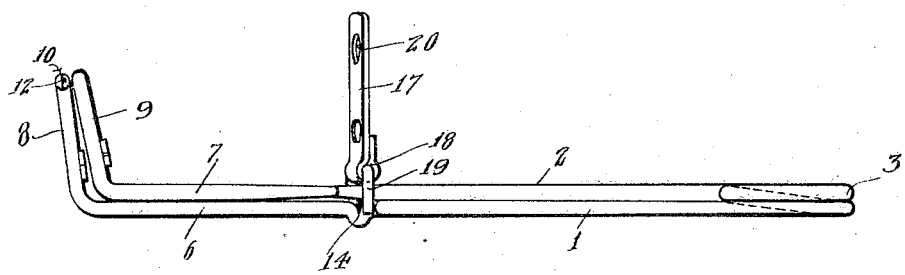
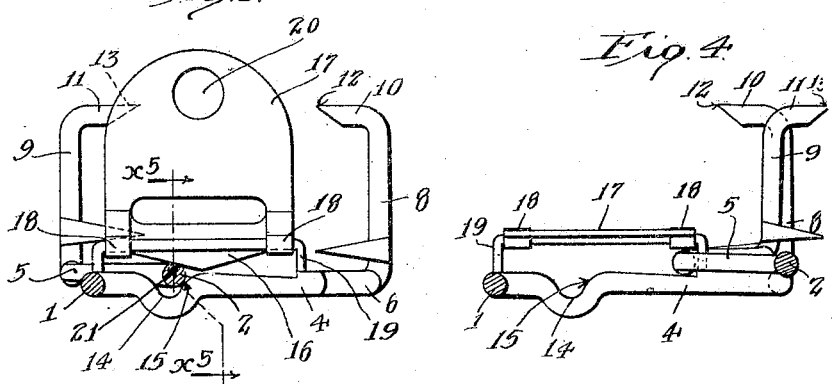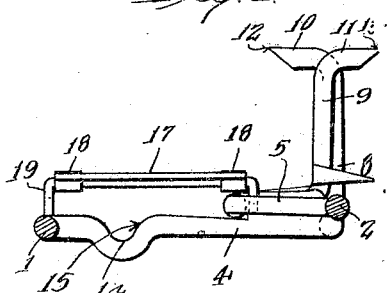
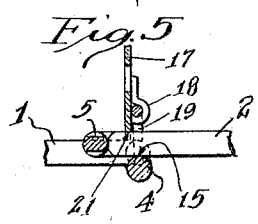
INVENTOR.
Charles J. Roy
BY Frederick Whyou
ATTORNEY.

UNITED STATES PATENT OFFICE.

CHARLES J. ROY, OF LOS ANGELES, CALIFORNIA.

TRAP.

1,377,441.     Specification of Letters Patent.     Patented May 10, 1921.

Application filed June 21, 1920. Serial No. 390,544.

*To all whom it may concern:*

Be it known that I, CHARLES J. ROY, a citizen of the United States, residing at Los Angeles, in the county of Los Angeles and State of California, have invented a new and useful Trap, of which the following is a specification.

An object of this invention is to provide a trap for catching rodents and the like.

This invention is an improvement on that disclosed in my Patent No. 1,332,360 dated March 2, 1920, and an object of this invention in contradistinction to those of said prior invention is the provision of a trigger which admits of greater refinement of adjustment than the construction shown in said patent.

Another object of the invention is to reduce the cost of manufacture over that of the prior patented trap mentioned above.

The accompanying drawings illustrate the invention.

Figure 1 is a plan view of a trap embodying the invention, the trap being shown in "set" position.

Fig. 2 is a side elevation of Fig. 1.

Fig. 3 is an elevation partly in section on line indicated by $x^3$—$x^3$ Fig. 1.

Fig. 4 is an elevation partly in section on the same plane that Fig. 3 is taken on, the parts being shown in the positions they occupy when the trap is sprung.

Fig. 5 is a sectional detail on line $x^5$—$x^5$, Fig. 3.

The trap is provided with arms 1, 2, one crossing the other, connected together at their rear ends by a coil 3. The arm 1 is provided with an obtuse angle bend at 4 forming a cross bar, and the arm 2 extends over the angular portion 4 and is bent at an obtuse angle at 5 to form a cross bar slightly in advance of the cross bar 4. The cross bar 5 is shorter than the cross bar 4. The arms 1, 2 extend forwardly from the cross bars 4, 5 in straight members 6, 7 respectively and at the forward ends of the members 6, 7 the arms are bent upwardly to form vertical members 8, 9 respectively and said arms thence extend inwardly toward one another to form jaws 10, 11 respectively, said jaws 10, 11 terminating in points 12, 13 for impaling the rodent caught in the trap. The coil 3 constitutes a spring for causing the points 12, 13 to be held toward one another and said coil is consequently of spring material. In the instance shown in the drawings the arms 1, 2 and coil 3 are formed of a single piece of material, for example spring steel, spring brass or the like.

The cross bar 4 is provided with a notch 14 adapted to receive the arm 2 when the arms 1, 2 are sprung away from one another at their forward jaw-providing ends. The side wall 15 of the notch 14 forms a shoulder against which the arm 2 is held by a wedge-shape member or tooth 16 formed by the lower marginal portion of a trigger 17. The coil 3 tends to yieldingly hold the arms 1, 2, at the points of their crossing, in different planes and therefore, unless the arm 2 is engaged by the member 16, the shoulder 15 cannot of itself retain the arm 2. The trigger 17 is in the form of a plate and is pivoted or journaled at 18 on an inverted U-shape standard 19. The legs of the standard 19 are welded or otherwise firmly secured to the opposite ends of the cross bar 4. In the instance shown in the drawings the trigger is constructed of a single piece of plate material which is pivoted on the member 19, portions of the lower edge of the plate being bent into tubular form to produce the journals 18. The plate 17 is preferably provided, though this is not absolutely necessary, with an opening 20. It is clear that when the arm 2 rests against the shoulder 15 and the member 16 is substantially in upright position, as in Fig. 5, the edge 21 of the wedge-shape member 16 forms an abutment preventing movement of the arm 2 away from the notch 14 and shoulder 15.

To "set" the trap the arms 1, 2 will be grasped between the loop 3 and plate 17 and sprung toward one another until the arm 2 registers with the notch 14, whereupon the upper portion of the plate 17 will be forced toward the jaws to cause the edge 21 of the member 16 to engage the arm 2 and push the arm, against the twist of the coil 3, into the notch 14 so that the arm 2 will bear partly against the shoulder 15 and partly against the edge 21. The friction will hold the trigger in "set" position.

In practice, to catch a rodent, for example a gopher, the trap will be inserted in the hole made by the gopher with the points 12, 13 projecting inwardly into the hole. When the gopher endeavors to run out of the hole he will strike the plate 17 and force the same rearwardly toward the coil 3 and thus release the arm 2, whereupon the point 13 will spring toward the point 12, impaling the gopher on said points.

The opening 20 allows light to pass through the plate 17 and the gopher, seeing the light, endeavors to enlarge the opening sufficiently to pass therethrough and in so doing forces the plate 17 rearwardly so as to spring the trap as above described.

It is to be noted that when the rodent has pushed against the plate 17 and started it rotating toward the coil 3, the member 16 is immediately thrust forwardly and upwardly by the upward pressure of the arm 2, said pressure being due to the natural spring of the arms 1, 2 away from each other when the arm 2 is in the notch 14. Thus a mere touch on the plate 17 will spring the trap.

I claim:

1. A trap comprising arms having jaws, one of said arms crossing the other, means tending to operate the arms to move the jaws toward each other, one of the arms having a notch to receive the other arm when the arms are adjusted to open the jaws, and means to releasably hold said other arm in the notch.

2. A trap comprising arms having jaws, one of said arms crossing the other, means tending to hold the arms with the jaws open, one of the arms having a shoulder, and means to releasably hold the other arm against the shoulder.

3. A trap comprising arms having jaws, one of said arms crossing the other, means tending to hold the arms at the crossing thereof in different planes with the jaws open, one of the arms having a shoulder, and means to releasably hold the other arm toward the shoulder.

4. A trap comprising arms having jaws, one of said arms crossing the other, a shoulder on one of the arms, a movable abutment connected with the last named arm, the shoulder and abutment coöperating to hold the other arm with the jaws in open position, and means tending to move the last named arm away from the shoulder when the abutment is retracted.

Signed at Los Angeles, California, this 14th day of June, 1920.

CHARLES J. ROY.

Witnesses:
GEORGE H. HILES,
L. BELLE WEAVER.